United States Patent Office 3,421,853
Patented Jan. 14, 1969

3,421,853
PRODUCTION OF HYDROGEN FLUORIDE FROM ALKALI- AND ALKALINE EARTH FLUOSILICATES
Ralph R. Hennig, Cos Cob, Conn., assignor to Allied Chemical Corporation, New York, N.Y., a corporation of New York
Filed Feb. 24, 1967, Ser. No. 618,361
U.S. Cl. 23—153        6 Claims
Int. Cl. C01b 7/22

ABSTRACT OF THE DISCLOSURE

Pure hydrogen fluoride is produced by pyrolysis of an alkali- or alkaline earth metal fluosilicate dispersed in a fluid stream of molten alkali- or alkaline earth metal silicate in the presence of water vapor at temperatures between 1300° C. and 1600° C. and recovering the resulting hydrogen fluoride.

---

Figure 1:
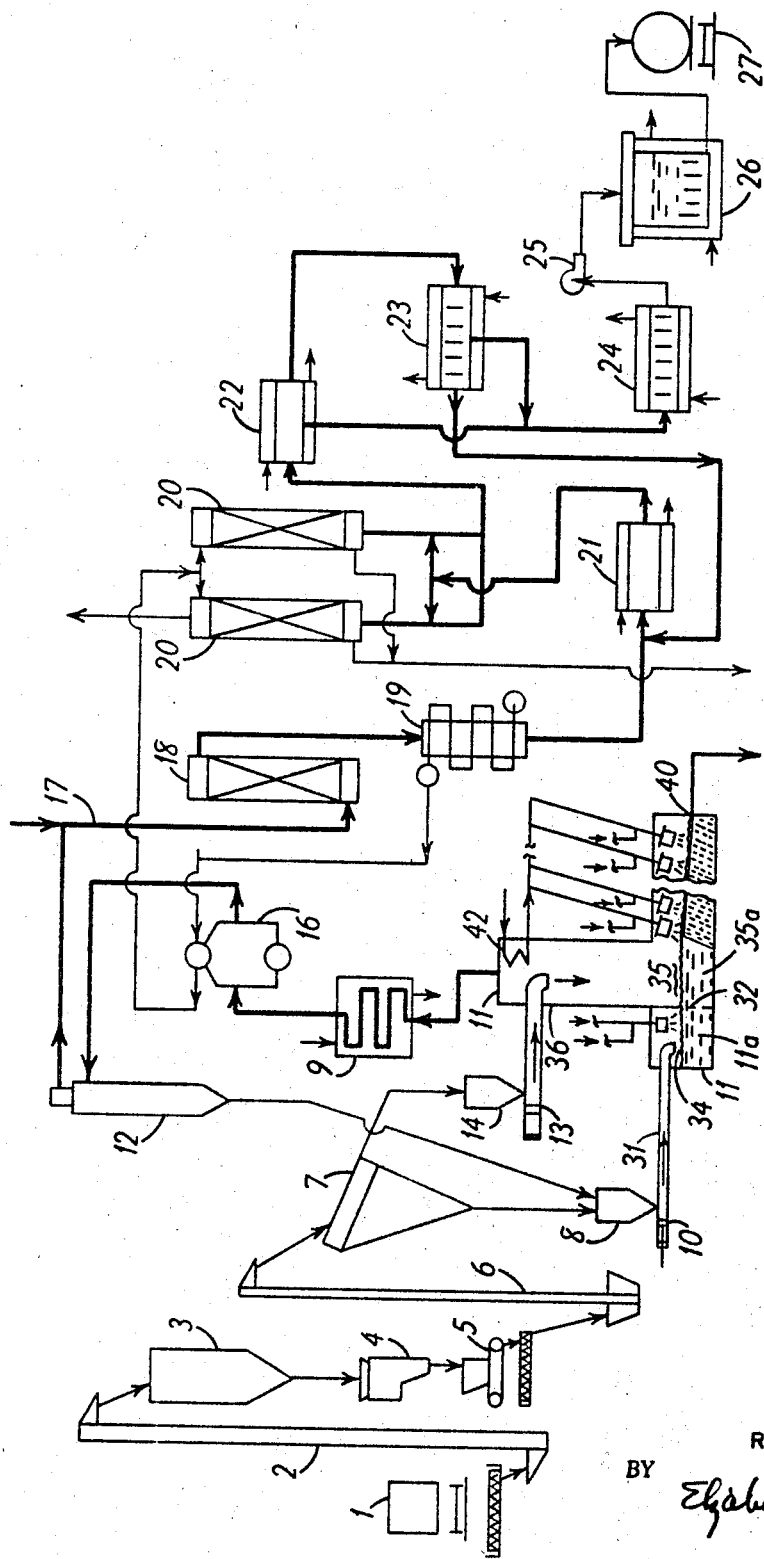

This invention relates to a process for the production of hydrogen fluoride from alkali- and alkaline earth metal fluosilicates, and more particularly, to a process for converting substantially all the fluorine values in the starting material to hydrogen fluoride.

Hydrogen fluoride has been produced in the past by the action of sulfuric acid on calcium fluoride of a high degree of purity, usually from the so-called "acid-grade" fluorspar ($CaF_2$) of about 99% purity and containing less than about 1.0% silica. This conventional acid-spar process is entirely dependent on the availablity of acid-grade fluorspar, the supply of which may become exhausted, and the price of which is continually rising.

Attempts to produce hydrogen fluoride by the decomposition of fluosilicic acid or alkali- and/or alkaline earth fluosilicates have resulted in substantial losses of the fluorine values as $SiF_4$, and have required handling and disposal of $SiO_2$ by-product.

It is an object of the present invention to provide a process for continuously manufacturing substantially pure hydrogen fluoride from low grade fluorine-containing ores. Another object of the invention is to provide a process in which substantially all the fluorine in the ore is recovered as hydrogen fluoride. A further object of the invention is to provide a process which produces no byproduct silica. A still further object of the invention is to provide a process which utilizes the poisonous fluoride waste gases from phosphate fertilizer manufacture produced as by-product in the widely practiced method of acidulating phosphate rock with sulfuric acid.

These and other objects are accomplished according to my invention wherein an alkali- or alkaline earth metal fluosilicate, alone or in admixture with minor proportions of an alkali- or alkaline earth metal fluoride and silica, dispersed in a fluid stream of molten alkali metal or alkaline earth metal silicate, is subjected to pyrohydrolysis at temperatures between about 1,300° C. and about 1,600° C. for a period sufficient to cause substantially complete release of fluorine from the melt as gaseous hydrogen fluoride, and substantial conversion of by-product silica to alkali- or alkaline earth metal silicate.

In carrying out the process of my invention, I prefer to utilize calcium fluosilicate ($CaSiF_6$) as starting material, dispersed in a melt of calcium silicate, although other alkali- and alkaline earth metal fluosilicates, including sodium fluosilicate, may be used when available, and part or all of the molten stream can comprise other alkali- or alkaline earth metal silicates. However, the calcium compounds are preferred as the fluosilicate is readily available as an inexpensive waste material from phosphate rock utilization and the fluoride is available as low grade fluorspar. The $CaSiF_6$ is available from the treatment of fluoroapatite mineral, $Ca_5(PO_4)_3F$, with sulfuric acid to produce phosphoric acid and superphosphate fertilizer. In this operation substantial quantities of fluorine in the form of $SiF_4$ are released when the rock is acidulated with sulfuric acid. This $SiF_4$ very quickly reacts with water vapor present in the gases exiting from the acidulation den, producing $H_2SiF_6$ and $H_2SiO_3$. This fluorine source can readily be converted to a form suitable for use in my process by reaction with an alkali- or alkaline earth metal salt such as calcium carbonate, sodium chloride or the like, according to the following equations:

(I)     $H_2SiF_6 + CaCO_3 \rightarrow CaSiF_6 + H_2CO_3$ or (II)     $H_2SiF_6 + 2NaCl \rightarrow Na_2SiF_6 + 2HCl$ In the case of the calcium salt, the precipitation of $CaSiF_6$ is alternatively readily accomplished by trickling the approximately 22 wt. percent $H_2SiF_6$ den scrubber effluent through a bed of lump CaO.

(III)     $H_2SiF_6 + CaO \rightarrow CaSiF_6 + H_2O$

Since the calcium salts are preferred, the discussion that follows will be directed primarily to the calcium silicate, fluorosilicate and fluoride but it will be understood that other alkali- and alkaline earth metal salts may be used, and their use will not substantially alter the temperature or other process requirements specified for the calcium salts, as will be apparent from the approximate melting points of the various salts listed below.

| Alkali- or alkaline earth metal salt: | Melting point, °C. |
|---|---|
| $CaSiO_3$ | 1,200 |
| $Na_2SiO_3$ | 1,088 |
| $K_2SiO_3$ | 976 |
| $Si_2SiO_3$ | 1,201 |
| $BaSiO_3$ | 1,604 |
| $CaF_2$ | 1,380 |
| KF | 880 |
| NaF | 980–997 |
| SiF | 870 |
| $BaF_2$ | 1,280 |

The pyrohydrolysis of the calcium fluosilicates takes place according to the general overall scheme shown in the equation:

(IV)     $CaSiF_6 + 3H_2O \rightarrow CaSiO_3 + 6HF$

In carrying out the pyrohydrolysis according to my invention calcium or other alkali- or alkaline earth fluosilicate can be used as the only raw charge material or it may be mixed with varying minor proportions of low grade fluorospar, $CaF_2$, or other alkali- or alkaline earth metal fluoride, provided a proportion of at least one mole of silica ($SiO_2$) for each mole of calcium fluoride is present or is added, conveniently in the form of sand, and the theoretically requisite amount of water is present, either added directly or obtained from the products of combustion of the hydrocarbon fuel, to effect the conversion to the same end products as result from the calcium fluosilicate viz:

(V)     $CaF_2 + SiO_2 + H_2O \rightarrow CaSiO_3 + 2HF$

A suitable ore charge will preferably contain between about 50 mole percent and about 100 mole percent of alkali- or alkaline earth metal fluosilicate, the balance being essentially a mixture of calcium fluoride ($CaF_2$) and silica ($SiO_2$) in a mole ratio of between about 1 mole and about 3 moles of silica per mole of $CaF_2$.

The process of the invention can be carried out in equipment conveniently arranged as schematically shown in the accompanying drawings.

Figure 2:
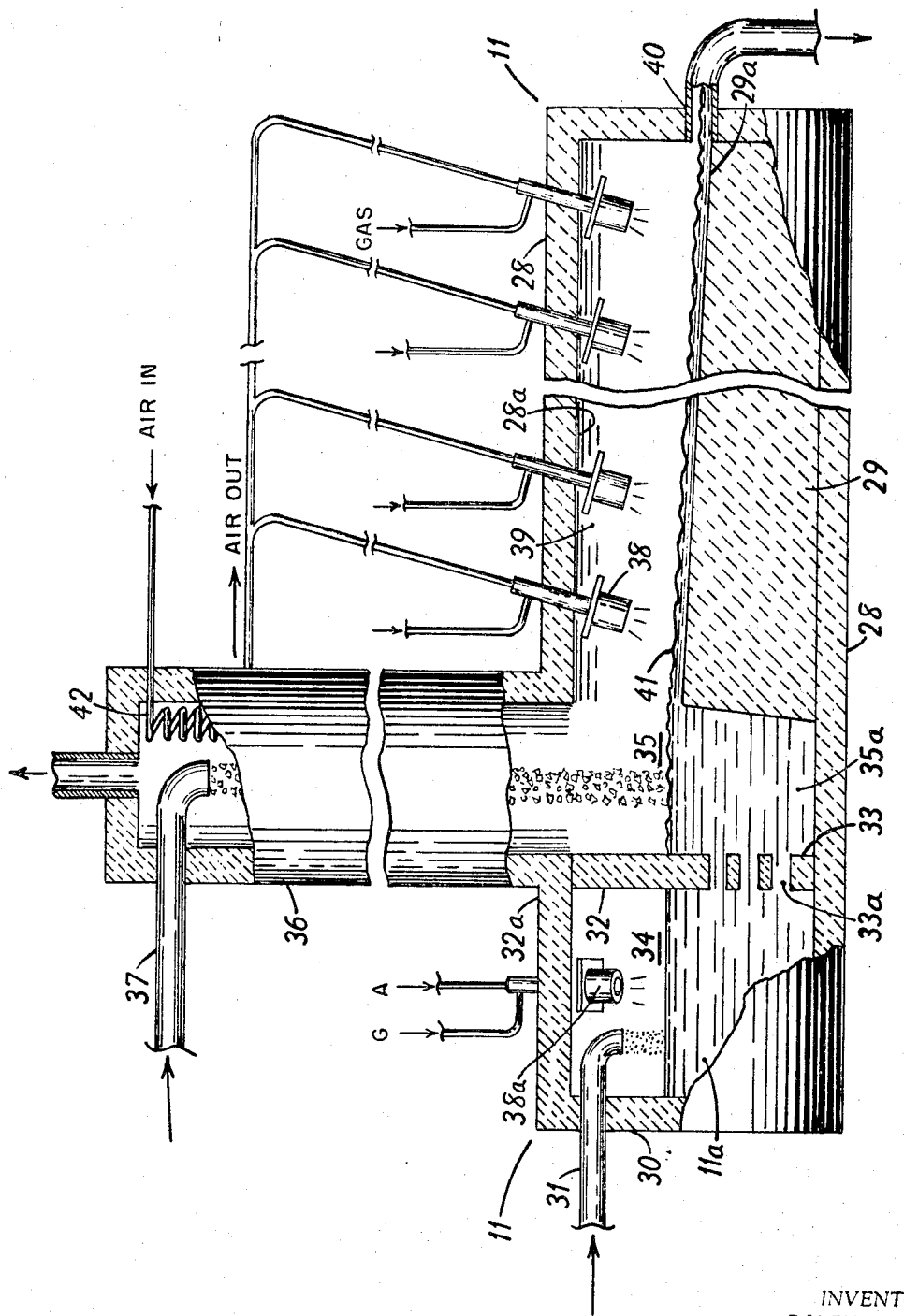

In the drawings, FIGURE 1 represents a flow sheet of the process for the conversion of the calcium fluosilicate, with or without admixture with low grade calcium fluoride, to anhydrous hydrogen fluoride and calcium silicate by-product. FIGURE 2 is a schematic representation of the furnace section in some detail.

Referring to the drawings, a suitable apparatus will include an ore unloading station 1, elevator 2, silo 3, bin 4, auxiliary feed mechanisms 5 and 6, screen 7, and $CaSiF_6$ storage hopper 8. Hydraulic ram 10 is provided to feed finely divided ore to a quiet, enclosed melting zone 34 of a refractory lined reverberatory furnace 11 containing a pool of molten reaction mass 11a. If a portion of the charge is comprised of siliceous fluorspar or other fluoride, especially if such material is in lump form, provision may be made for feeding part or all of these materials from another hopper car unloading site through additional feed mechanisms similar to items 2-6 to screen 7, such as through hopper 14 and feeder 13 to the top of the shaft 36 of furnace 11 and thence into a second melting zone 35. Alternatively, such additional feed materials may be charged through the same feed facilities as used for calcium fluosilicate.

Radiant cooler 9 is provided for exit gases, followed by waste heat boiler 16. The gases discharging from the waste heat boiler at about 400° C. (752° F.) pass successively through a conventional steel cyclone 12 and then, after dilution with air at 17, if required, pass to $SiF_4$ adsorber-eliminator 18. The radiant heat interchanger 42 at the top of the shaft furnace 11 provides preheated furnace combustion air. Dust eliminated in cyclone 12 is returned to bin 8 for recycle to furnace 11.

For concentration and purification of product HF, there is provided a $SiF_4$ adsorber 18 packed with NaF pellets, followed by an economizer 19, and a conventional heat exchanger 21, followed by at least two adsorption towers 20 packed with pelletized sodium fluoride or other adsorbent for HF. Finally there are provided heat exchangers 22, refrigerators 23 and 24, conventional product pump 25, HF storage facilities 26, and loading equipment 27.

In FIGURE 2 is shown a modified reverberatory furnace 11 comprising a horizontal reaction chamber 28 with arched roof 28a built of a suitable refractory material such as a high alumina refractory ("Coralite" of Harbinson-Walker), and lined on the inside with blocks of pre-cast calcium silicate 29. End wall 30 is provided with raw material fines inlet feed device 31. A barrier wall 32, located directly beneath the forward wall of shaft 36, and extending downwardly into the furnace, forms with end wall 30, a small enclosed compartment 34 extending beyond the furnace proper. The internal wall is built of alkali resistant refractory brick (such as Harbinson-Walker "Korundal") and consists of an upper solid section 32 extending from below the melt level to the hemi-cylindrical top of the horizontal portion of the furnace, and a lower checkered or perforated partition 33 extending to the bottom of the horizontal reverberatory section of the furnace 28. The enclosed melt zone 34 connects only through the perforations 33a with a second melt zone 35, containing molten reaction mass 35a. The solid portion of the barrier wall 32 effects a liquid seal, closing the fines melt compartment from the rest of the furnace, thus insuring that the water vapor and silicon tetrafluoride fumes produced as intermediary in decomposition reaction (IV), are forced to bubble through the hot reacting mass. Positioned above the horizontal reaction chamber 28 is a cylindrical shaft 36 with ore inlet 37 near the top thereof. The perifery of shaft 36 is positioned above second melt zone 35 and is directly connected therewith for discharge of ore thereinto.

Horizontal chamber 28 of the reverberatory furnace extends several times the length of the two deep melt zones, for example 2 to 3 times their length, in the opposite direction therefrom and is provided with a raised, slightly inclined, platform 29a of refractory material (such as Harbinson-Walker "Korundal") overlaid with semi-molten calcium silicate. Partially melted calcium silicate also serves to cement the individual alkali resistant refractory blocks to one another. The inclined platform 29a is below the longitudinal axis of the horizontal cylinder, and provides a shallow melt zone 39 wherein the molten reaction mass flows by gravity in a shallow stream 41.

Disposed along the length of the horizontal portion of the refractory furnace are a plurality of high velocity, positive flame-stabilized gas burners 38, for example 10 in number, of a type similar or equal to burner Model 642 of the Thermal Research & Engineering Corporation, Conshohocken, Pennsylvania. These burners are conveniently equally spaced along the length of the furnace, and direct their flames downward and backward with respect to process flow, to cause agitation and intimate mixing of the water vapor and other products of combustion of the fuel into the molten reacting mass 41. More than sufficient water is produced from the combustion of the hydrocarbon fuel to meet the requirements of reactions (IV and V).

In addition to the burners disposed along the length of the reverberatory furnace, additional but similar burners 38a, for example 2 in number, are located opposite one another in the quiet melt zone 34. Two burners are usually sufficient in this area since the heat to melt and react calcium fluosilicate is less than that required for the production of an equivalent amount of hydrofluoric acid from crude siliceous fluorspar. Here again, more than sufficient water is provided from the combustion of the hydrocarbon fuel to satisfy the requirements of reaction (IV). Air for the gas jets is conveniently preheated in the vertical gas exit portion of the furnace shaft 36 as in heat exchanger 42 positioned in the upper portion thereof. At the end of horizontal cylinder 28 is melt exit 40, through which by-product calcium silicate flows by gravity to a casting area, wherein the calcium silicate by-product may be cast as blocks for refractory lining or may be further processed as desired.

In carrying out the process according to my invention, a melt is first formed by charging the furnace, through shaft 36, with lump alkali- or alkaline earth metal silicate preferably calcium silicate, the burners are lighted; and the entire furnace is slowly brought to operating conditions as indicated by a molten pool, at a temperature in the range of about 1200° C. to 1600° C. (ca. 2200° F. to 3000° F.). It is important that the reactions to produce HF not proceed until temperatures in the environs of any siliceous material exceed about 590° C. (1100° F.) at which temperature the reaction between silica and hydrofluoric acid is reversed.

If siliceous fluorspar is to be included in the operation, it is now charged to the shaft 36 of the furnace, and gradually subsides into the molten bath as the lumps of calcium fluoride/silica melt down from the shaft 36 into the principal melt zone 35.

Then alkali- or alkaline earth metal fluosilicate, alone or blended with silica-bearing fluorspar dust from screening operation 7, is fed to melt zone 34. The calcium or other fluosilicate salts may be anhydrous or may contain water of crystallization ($CaSiF_6 \cdot 2H_2O$). The excess water vapor produced contributes to the reaction and is removed in subsequent steps to be described. The alkali- or alkaline earth metal fluosilicates, ore, and ore dust, are fed in proportions to maintain, in the initial melt zone 34, a pool of melt in which additional charge may be reasonably rapidly melted; and to provide a positive flow of calcium silicate by-product into and through the balance of the furnace structure. HF produced in zone 34, together with $SiF_4$ fumes, water vapor, and other products of combustion pass through the openings in partition 32, and enter the main reaction melt zone 35. As the pyrohydrolysis reaction proceeds, alkali- or alkaline earth metal silicate is produced as a final product of the reaction and replenishes the fluid reaction medium so that usually no further charging of calcium or other silicate is required after the initial melt is formed.

If the process is to be operated with a mixture of alkali- or alkaline earth metal fluosilicate and siliceous calcium fluoride, proportions will be governed by the particular economics and circumstances prevailing during the time of operation. When calcium fluoride is used as a portion of the mix, it must be accompanied by at least one mole of silica ($SiO_2$) per mole of $CaF_2$. In order to provide for the simultaneous feed of both siliceous fluorspar and fluosilicate, a duplicate set of weighing devices, feed bins, and truck loading systems is required. This duplicate system, identical to items 1, 2, 3, 4, 5, of FIGURE 1, is not shown.

If desired, part of the total ore charge may be admitted to the second melt zone 35. It is particularly convenient to feed such portion of the charge to the second zone when it is in lump rather than in finely divided form. A convenient mode of operation, if the charge is partly in lump and partly in the form of fines, is to charge two portions of feed, lumps, and fines, in separate streams to the decomposing chamber, charging the lumps through inlet 37 to the second melt zone 35, the fines through inlet 31 to the first melt zone 34. If calcium or sodium fluosilicate alone is used, screening is usually not necessary, as this material is usually available in finely divided form such that all of it may be introduced as fines into the first melt zone 34. Calcium fluoride is conveniently supplied in form containing both lumps and fines, in which event it may be screened to provide two feed streams, lumps, and fines.

When the furnace is filled and the melt has attained the required fluidity in the deep melting zones, the molten charge flows by gravity through the highest temperature zone 39, along its inclined base, at temperatures of about 1300° C. to 1600° C., as a shallow stream, for example 3 to 6 inches deep and of sufficient length to assure complete decomposition of the melt charge.

The molten $CaSiO_3$ stream will discharge as by-product through exit 40 to a brick casting area or quench zone. Hot HF produced in each of the melt zones, together with gaseous products from evaporation and combustion, exit through the shaft 36 of the furnace at a temperature of about 1090° C. to 1260° C. (2000° F. to 2300° F.).

The composition of the gases evolved depend on the character and composition of raw materials charged and vary from about 11 weight percent hydrogen fluoride when operating on a 50/50 mixture of fluosilicate+spar and silica, to more than 50 weight percent when $CaSiF_6 \cdot 2H_2O$ is the sole raw material. In addition to hydrogen fluoride, the combustion gases from the burners, consisting of variable amounts of nitrogen, carbon dioxide, water vapor, sulfur dioxide, and oxygen as well as traces of the oxides of lead, calcium, barium, iron, and substantial amounts of silica dust from the ores, are present is the gases exiting the shaft 36 of the furnace. Some of these products are the result of the high temperature reactions, while some of the dust and other materials are entrained in the gases passing through the shaft of the furnace. The hot gases containing product HF and contaminants preheat the ore in the furnace shaft.

Exiting from the top of the furnace shaft, the dust ladened gases pass through radiant cooler 9 and enter waste heat boiler 16 at about 540° C. (1004° F.). The gases discharging from the waste heat boilers at about 400° C. (752° F.) pass successively through a conventional steel cyclone 12 where dust particles are removed, and then to $NaF$-$SiF_4$ adsorber 18. The dust (−50 mesh U.S.) returned from the cyclone 12 mixes in the fines bin 8 with additional (−50 mesh) raw material from the primary fines screen 7, and the composite feed is forced into the fines melt pit portion of the furnace 34, through feed device 31. Calcium fluosilicate feed, preferably less than 15 mesh, will be supplied to fines screen 7 through unloading station 1, elevator 2, fluosilicate silo 3, bin valve 4, feed mechanisms ("Weightrol") 5, and blend elevator 6. The gases exiting cyclone 12 pass to the $NaF$-$SiF_4$ adsorber 18 at about 370° C. (700° F.) and leave at a temperature in a vicinity of 340° C. (644° F.) flowing to economizer 19. A conventional heat exchanger 21 serves to further cool the gas stream to 105° C. (220° F.) before passing to the primary NaF-HF absorbers 20.

These NaF-HF adsorbers serve to completely remove the HF and to pass such impurities as $H_2O$ vapor, $SO_2$, CO, $N_2$, and $CO_2$ diluent to the stack. The adsorption-purification system is designed to provide complete adsorption of HF at 100° C. (212° F.), and complete desorption at 350° C. (662° F.). This conventional two bed "adsorb-desorb" system provides for alternate adsorption and desorption cycles. The design of these adsorbers is variable and in accord with principles familiar to those experienced in the art. They may provide, by way of example, finned-tube heat transfer surfaces using water for cooling in preparation for adsorption, and they may use steam for heating prior to desorption. An alternate superheated system provides for the use of superheated anhydrous hydrogen fluoride gas for desorption. This allows direct contact of the hot gases with the pelletized adsorbent.

In a preferred method, gases enter an $NaF$-$SiF_4$ adsorber 18, at 370° C. (700° F.) and leave at a temperature in the vicinity of 340° C. (650° F.) flowing to economizer 19. The gases are further cooled to 105° C. (220° F.) in heat exchanger 21 before passing to the primary NaF-HF adsorber. This NaF-HF adsorber removes the HF nearly completely, passing impurities such as $H_2O$ vapor, $SO_2$, CO, $N_2$ and $CO_2$ diluent to the stack. The processing of $CaSiF_6$ or $Na_2SiF_6$ will require dilution of adsorber gases as brought out above to insure an HF concentration sufficiently dilute (less than about 10–12 percent) to avoid blinding of the NaF adsorbent. This can be achieved by use of dilution air bled into the product gas line at location 17.

At least two HF adsorption towers are provided, one adsorbing, while the other is being desorbed. After desorption is accomplished, rapid cooling of the HF-containing adsorbent from 327° C. (620° F.) to 100° C. (212° F.) may be effected, to reactivate the adsorbent, as by passing water at say 25° C. (75° F.), through the tube-side of the fin tube heaters. Heating on the reverse desorption cycle is attained through the use of say 430° C. (806° F.) superheated steam. The desorbed high purity anhydrous HF gas flows, because of the pressure differential between desorber and condenser, through a water-cooled heat exchanger 22, where heat of HF association is removed, then through a conventional refrigeration system 23 and 24 for liquefaction, and finally to storage 26.

The success of my process depends, in part, upon maintaining levels of temperature high enough to prevent reversal of the reaction, which occurs at about 594° C. (1100° F.), by which $SiF_4$ and $H_2O$ are converted to HF and $SiO_2$ (see Equation (b) below). It also depends on the continuous presence in the reacting mass of suitable proportions and quantities of reactants, on the provision of reactor volumes sufficient to provide residence times necessary for the complete release of HF product and the complete conversion of starting materials to by-products calcium silicate, and finally, on the maintenance of reaction temperature levels compatible with rapid forward velocities of reactions (a), (b) and (c) below, which effect overall reaction (IV).

Under proper operating conditions three successive reactions occur, namely (a) the thermal decomposition of an alkali- or alkaline earth metal fluosilicate to produce the corresponding fluoride and $SiF_4$, (b) pyrohydrolysis of SiF$_4$ to produce HF and SiO$_2$, (c) elimination of SiO$_2$ by the high temperature solubilization of SiO$_2$ in the molten reaction mass with subsequent conversion to a non-volatile silicate. Reaction (c) proceeds with the production of additional HF by the reaction between the fluoride of step (a) and the silica of step (b).

Although the overall reaction path has not been definitely determined, it is believed that the following successsive reactions take place:

(a) $CaSiF_6 \rightarrow CaF_2 + SiF_4$
(b) $SiF_4 + 2H_2O \rightarrow SiO_2 + 4HF$
(c) $CaF_2 + SiO_2 + H_2O \rightarrow CaSiO_3 + 2HF$ The CaSiF$_6$ decomposes (without melting) according to Equation (a) at temperatures of about 365° C. (690° F.) to 400° C. (750° F.). Equation (b) goes to the right, i.e., produces SiO$_2$ and HF at temperatures above 600° C. (1112° F.), the two reactions thus producing a 1:1 mole ratio mixture of solid CaF$_2$ and SiO$_2$. These two products, while having individual melting points of 1380° C. (2512° F.) and 1713° C. (3084° F.) respectively, have, in admixture with each other, sharply reduced melting points, as shown in Table I. Thus when present in the 1:1 mole ratio provided by Equations (a) and (b), these products provide a system having a melting point of about 1260° C. (2300° F.) in which SiO$_2$ diffuses and reacts as shown in Equation (c) to release further HF from the melt. At 1300° C. (2372° F.) a very liquid melt results with a fluidity compatible with the free circulation of bubbles.

Melting points of mixture of SiO$_2$ and CaF$_2$ are shown in Table I below:

TABLE I
[Melting points of various SiO$_2$/CaF$_2$ mixtures]

| SiO$_2$, weight | CaF$_2$, weight | CaF$_2$, mole percent | M.P., ° C. |
| --- | --- | --- | --- |
| 100 | 0 | 0 | 1,713 |
| 0 | 100 | 100 | 1,380 |
| 1 | 0.33 | 20 | Over 1,420 |
| 1 | 0.66 | 34 | 1,360 |
| 1 | 1.00 | 43.5 | 1,250 |
| 1 | 1.33 | 53.5 | 1,280 |
| 1 | 2.00 | 60.5 | 1,280 |
| 1 | 2.25 | 63.3 | 1,265 |
| 1 | 2.50 | 65.7 | 1,250 |
| 1 | 3.00 | 69.8 | 1,225 |
| 1 | 3.50 | 72.8 | 1,240 |
| 1 | 4.00 | 75.5 | 1,265 |
| 1 | 5.00 | 79.4 | 1,300 |
| 1 | 10.00 | 87.4 | 1,315 |

As can be seen from Table I, proportions of silica to CaF$_2$ in amounts in excess of the 1:1 mole ratio provided by the decomposition of CaSiF$_6$ can readily be absorbed in the molten slag, up to about 1.5:1 without raising the melt temperature above about 1400° C. (2552° F.). This situation makes feasible the use of low grade, high silica ores as a substantial portion of the ore feed stock according to my invention. The liquidity relationships set forth above indicate that the proportions of calcium fluoride and silica used should preferably be regulated to provide a melt near the eutectic. However, operation over a wide range of concentrations is feasible with molar proportions of calcium fluoride to SiO$_2$ varying from 50 percent to more than 75 percent.

Stoichiometry requires three moles of water vapor per mole of fluosilicate and one mole of silica per mole of calcium fluoride for the conversion of these compounds to hydrofluoric acid. In practice it is desirable to have a considerable excess of water present over that theoretically required. In the case of the fluosilicate some of this water may be supplied with the crystalline material as water of crystallization. However, excessive amounts of water vapor are contained in the products of combustion of the common gaseous or liquid hydrocarbon fuels used as a source of heat, which provide an ample excess of water over the stoichiometric requirements of the reactions. Thus the water vapor so supplied is more than enough to rapidly and completely react either fluoride or fluosilicate as shown by reactions IV and V so that neither use of hydrated salts nor other form of water addition is necessary. The mole of silica required in reaction V can most conveniently be supplied in the form of siliceous fluorspar containing at least 50 weight percent SiO$_2$. The use of abundant, inexpensive, low grade (less than 50% CaF$_2$) siliceous spar, previously too expensive to upgrade, represents an advantage of this process.

My process is unique in combining the three above reactions (a), (b) and (c) in a single operation in which all occur substantially simultaneously thus resulting in elimination of troublesome silica which formerly made recovery of HF from alkali- or alkaline earth fluosilicates very difficult. The combining of the three reactions into a single process has the further advantage of enabling me to utilize low grade, silica-containing calcium fluoride ores as a component of the alkali- or alkaline earth metal fluosilicate charge. Another advantage of my invention is that it requires a minimum of process steps, and is amenable to automatic control, which reduces the productive labor requirements.

Temperatures of reaction are critical and should be at least about 1300° C. to maintain liquidity and to prevent reversal of the reaction represented by equation (b), since reversal will not occur at temperatures this high. It is essential that the SiF$_4$ preliminary gaseous decomposition product of the calcium fluosilicate equation (a) bubble through a mass of molten CaF$_2$–CaSiO$_3$ to ensure reaction with the water vapor content. Temperatures in the vicinity of 1300° C. are necessary to maintain a melt with viscosity compatible with the free circulation of the bubbles, pyrohydrolysis to SiO$_2$ and HF, and solution of SiO$_2$ into the CaSiO$_3$ slag.

The SiO$_2$ intermediate by-product from equation (b) diffuses into the molten mass, reacting with CaF$_2$ and H$_2$O to form CaSiO$_3$ with liberation of HF according to equation (c). In order to consume the SiO$_2$ in the above manner, it is necessary that the reaction proceed at a very rapid rate, i.e., that the temperature be sufficiently high to ensure a rapid reaction. Thus at temperatures of 1300° C. to 1600° C. an overall conversion to HF of about 92% to 95% results in about 0.02 second, permitting reactor volumes to be maintained at a minimum.

While it is preferable to provide silica in the proportion of substantially molecular equivalence to the calcium fluoride in order to ensure conversion of silica to calcium silicate according to equation (c), substantial excesses of silica can be tolerated and will form a homogeneous melt which can readily be removed from the furnace and cast into bricks as described, preferably but not necessarily, using proportions of silica near the eutectic points of SiO$_2$·CaSiO$_3$ at ratios of 64 wt. percent of SiO$_2$ or 45 wt. percent of SiO$_2$.

Suitable refractories serviceable at the high temperatures contemplated in the process of my invention include, besides pyrolytic graphite, high alumina refractories and various zirconium oxide and/or zirconium silicate refractories, e.g., "Zircofrax," "Leco-Zircon," and the like, and a few siliceous refractories normally unsuited to exposure to HF. This inertness to HF is due to the reversal of the reaction between HF and SiO$_2$ at temperatures of 600° C. (1112° F.) and higher. Consequently, vapor phase off-gases can be conducted through relatively inexpensive refractory materials to areas where the 600° C. (1112° F.) isotherm is crossed. Thus the use of comparatively expensive refractory materials suitable for containment of the alkaline molten mass at temperatures to about 1650° C. (3000° F.) can be minimized.

In a preferred embodiment of the invention, cast refractory brick made of the final reaction product CaSiO$_3$ or BaSiO$_3$ are used, to separate the molten reaction mass from the outer container. These brick refractories may be merely placed in position, and solidification of the molten reaction mass, which will flow between the refractory bricks, assures tightness of the reactor. Using this technique, the reaction mixture is ultimately contained in a monolithic casing of the reaction products.

The following specific examples further illustrate the invention.

Example 1

A feed composed of hydrated calcium fluosilicate (—50 mesh U.S.), $CaSiF_6 \cdot 2H_2O$ and analyzing $CaSiF_6$ 83.5% and $H_2O$ 16.5% by weight, is fed into a calcium silicate melt in the preliminary melting zone 34 of a furnace of the type shown in FIGURE 2 of the appended drawings, at a rate of about 2.5 tons per hour. The molten mass within this preliminary melting zone is maintained at about 1200° C. (2200° F.). The fluosilicate salt introduced into the preliminary melting zone rapidly decomposes into gaseous silicon tetrafluoride, water vapor and molten calcium fluoride. The gaseous decomposition products, which include substantial amounts of water vapor and other gases from the combustion of natural gas, are prevented from escaping back through the fuel pipe by the ram pressure of the hydraulic feeders, and therefore force or pump the molten decomposed salts, together with steam and silicon tetrafluoride into the deep melting zone 35. In this zone temperatures are maintained within the range of 1315° C.–1370° C. (2400° F.–2500° F.) to ensure a fluid, nonviscous melt. The furnace design provides an overflow of highly fluid material from the deep melting zone to the inclined, shallow, decomposition zone in which temperatures are maintained near 1600° C., (1580° C.–1620° C.) (ca. 2900° F.) by means of burners which also create turbulence in the melt and supply water vapor required for completion of the several reactions which release HF.

The rate of reaction is rapid at these temperatures, and conversion continues throughout the five to six hour period during which the reactants are present in the high temperature zone. The product and by-product gases rise through the molten mass in both the deep melting and shallow reaction zones causing turbulence and agitation, before leaving through the vertical shaft of the decomposition furnace. Molten calcium silicate byproduct streams out from the opposite end of the furnace through the submerged port in the well closing the end of the shallow reaction zone. Upon discharge from the furnace the molten calcium silicate stream flows to a casting zone. The product gases exit from the shaft top at about 1260° C. at the rate of about 74,500 s.c.f. per hour, i.e., about 4,916 pounds per hour, having the approximtae composition:

|       | Wt. percent | Lb./hr. |
|-------|-------------|---------|
| HF    | 41          | 2,500   |
| $N_2$ | 40          | 1,970   |
| $CO_2$| 7.7         | 378     |
| $H_2O$| 1.37        | 68      |
| $SiF_4$| Trace      |         |
|       | 100.00      | 4,916   |

The gases pass through a cyclone, wherein entrained dust is removed, and are next diluted with air. This diluent air is fed into the adsorber gas line at the rate of about 304,000 cubic feet (21° C. (70° F.) and 1 atm.) per hour to reduce the HF concentration to about 10% to 11% to prevent "blinding," i.e., deactivating, the NaF adsorbent. The gases then pass at about 370° C. (700° F.) to a first adsorber packed with NaF pellets. Here the $SiF_4$ is selectively adsorbed. The gases leave this adsorber at about 340° C. (644° F.), then flow successively to a heat economizer, and a conventional heat exchanger where they are cooled to 100° C. (212° F.). The 100° C. (212° F.) gases then pass through a second NaF packed adsorber where HF removal is substantially complete, leaving a stack gas of approximately the following composition:

|        | Wt. percent | Lbs./hr. |
|--------|-------------|----------|
| $N_2$  | 72.5        | 15,300   |
| $CO_2$ | 16.9        | 3,520    |
| $H_2O$ | 10.6        | 2,260    |
| $SO_2$ | 0.01        | 2.4      |
|        | 100.0       | 21,082.4 | which is pased to waste at a rate of about 270,000 s.c.f./hr. or about 21,082 pounds per hour.

The product HF is released from the NaF adsorbent by heating the adsorbent to about 350 C., whereupon the HF is released as 99.9% purity anhydrous hydrogen fluoride at a rate of about 2,500 lbs. (1.25 tons)/hr. This pure HF product gas is cooled in a water cooled heat exchanger and is then liquefied with conventional refrigeration equipment. Finally the product is pumped to storage.

Example 2

Similar results are obtained when about 30% of the feed consists of a mixture of siliceous calcium fluoride having an analysis of:

|           | Weight percent |
|-----------|----------------|
| $CaF_2$   | 20.4           |
| $SiO_2$   | 74.4           |
| $CaCO_3$  | 0.9            |
| $BaSO_4$  | 0.1            |
| $Al_2O_3$ | 1.6            |
| Insolubles| 2.6            |
|           | 100.0          |

This material is fed in lump form into the main melting zone 35 at a rate of about 0.75 ton per hour. At the same time $CaSiF_6 \cdot 2H_2O$ is fed into preliminary melting zone 34 at a rate of about 1.75 tons per hour. The fluosilicate and the calcium fluoride plus silica decompose according to equations (a), (b) and (c) above. Recovery of 99.9% purity HF at about 0.95 ton per hour is obtained.

While the above describes the preferred embodiments of my invention, it will be understood that departures can be made therefrom within the scope of the specifications and claims.

I claim:

1. The process for producing hydrogen fluoride which comprises subjecting an alkali-or alkaline earth metal fluosilicate, dispersed in a fluid stream of molten alkali metal- or alkaline earth metal silicate, to pyrohydrolysis in the presence of water vapor, at temperatures between about 1300° C. and about 1600° C. for a period sufficient to cause substantially complete release of fluorine from the melt as gaseous hydrogen fluoride and substantial conversion of by-product silica to alkali- or alkaline earth metal silicate.

2. The process for producing hydrogen fluoride which comprises dispersing an alkali- or alkaline earth metal fluosilicate in a fluid pool of molten alkali- or alkaline earth metal silicate, maintaining the melt within the temperature range between about 1300° C. and about 1600° C. while flowing it in a shallow turbulent stream within a heated zone, in the presence of at least 3 moles of water vapor per mole of fluosilicate, maintaining said conditions for a period sufficient to cause the metallic fluosilicate to decompose substantially completely into the corresponding metallic silicate and gaseous by-products, the latter containing substantially all the fluorine in the original fluosilicate in the form of hydrogen fluoride.

3. The process for producing hydrogen fluoride which comprises forming a molten pool of an alkali- or alkaline earth metal silicate, introducing into said pool a charge of alkali- or alkaline earth fluosilicate, maintaining said melt at temperatures between about 1300° C. and about 1600° C., while flowing it in a shallow turbulent stream within a heated zone, in the presence of at least 3 moles of water vapor per mole of fluosilicate, maintaining said conditions for a period sufficient to cause the metallic fluosilicate to decompose substantially completely into the corresponding metallic silicate and gaseous by-products, the latter containing substantially all the fluorine in the original fluosilicate in the form of hydrogen fluoride and recovering the hydrogen fluoride by contacting sodium fluoride therewith at a temperature of about 100° C. followed by heating the HF-saturated sodium fluoride at a temperature of at least about 350° C. to release pure anhydrous hydrogen fluoride.

4. The process for producing hydrogen fluoride which comprises forming a fluid pool of molten calcium silicate in a quiescent melting zone, introducing into said fluid pool, solid calcium fluosilicate in particulate form, whereby said calcium fluosilicate is decomposed into a mixture of normally solid and normally gaseous decomposition products, flowing the resultant mixture into a turbulent melting zone maintained at temperatures in the range between about 1300° C. and about 1600° C., maintaining said mixture under turbulence in said melting zone under said temperature conditions for a period sufficient to convert substantially all the fluorine in the calcium fluosilicate to hydrogen fluoride, and thereafter recovering the hydrogen fluoride.

5. The process for producing hydrogen fluoride which comprises forming a melt comprising an alkali- or alkaline earth metal silicate, introducing into said melt a mixture of (1) a metallic fluosilicate selected from the group consisting of alkali fluosilicates and alkaline earth fluosilicates, (2) calcium fluoride and (3) silicon dioxide, the metallic fluosilicate being introduced in proportions between about 50 mole percent and 100 mole percent of the total charge, the balance being essentially a mixture of calcium fluoride and silicon dioxide, the latter two components being in the proportion of at least about one mole of silicon dioxide per mole of calcium fluoride, raising the temperature of said melt to between about 1300° C. and about 1600° C., maintaining the melt within said temperature range while flowing it in a shallow turbulent stream within a heated zone, in the presence of at least 3 moles of water vapor per mole of metallic fluosilicate and at least one mole of water vapor per mole of calcium fluoride, and maintaining said conditions for a period sufficient to cause the metallic fluosilicate and the calcium fluoride to decompose substantially completely into the corresponding metallic silicate and gaseous by-products containing substantially all the fluorine in the original fluorine-containing compounds, in the form of hydrogen fluoride.

6. The process according to claim 5 wherein the mole ratio of silicon dioxide to calcium fluoride is approximately 1:1.

References Cited

UNITED STATES PATENTS

| | | | |
|---|---|---|---|
| 292,742 | 7/1943 | Beck et al. | 23—1 |
| 393,258 | 7/1943 | Beck et al. | 23—1 |
| 2,584,894 | 2/1952 | MacIntire | 23—153 XR |
| 3,073,676 | 1/1963 | Mollard et al. | 23—153 |

FOREIGN PATENTS 1,355   4/1926   Australia.

EARL C. THOMAS, *Primary Examiner.*

E. STERN, *Assistant Examiner.*

U.S. Cl. X.R.

23—88, 110, 182, 205